United States Patent
Rathschlag et al.

(10) Patent No.: US 6,432,195 B1
(45) Date of Patent: Aug. 13, 2002

(54) PIGMENT PREPARATION WITH MODIFIED COLOPHONY RESINS

(75) Inventors: Thomas Rathschlag, Weilburg; Carsten Griessmann, Gross-Zimmern; Sabine Schoen, Darmstadt; Werner Sarfert, Ganderkesee, all of (DE)

(73) Assignees: Merck Patent Gesellschaft mit beschraenkter Haftung; Lackharzwerke Robert Kraemer GmbH & Co., both of (DE)

( * ) Notice: Subject to any disclaimer, the term of this patent is extended or adjusted under 35 U.S.C. 154(b) by 0 days.

(21) Appl. No.: 09/853,863

(22) Filed: May 14, 2001

(30) Foreign Application Priority Data

May 12, 2000 (DE) .......................................... 100 23 286

(51) Int. Cl.[7] ........................... C04B 14/20; C08K 3/00; C08L 93/04; C08L 101/00; C09D 5/03
(52) U.S. Cl. ...................... 106/500; 106/417; 106/418; 106/439; 106/445; 106/446; 106/447; 106/456; 106/457; 106/460; 106/482; 106/491
(58) Field of Search ................................ 106/500, 417, 106/418, 439, 445, 446, 447, 456, 457, 459, 460, 482, 491

(56) References Cited

U.S. PATENT DOCUMENTS 4,859,728 A * 8/1989 Schneider et al. .......... 523/351

FOREIGN PATENT DOCUMENTS

| EP | 796900 | * | 9/1997 |
| EP | 897956 | * | 2/1999 |

OTHER PUBLICATIONS

Derwent Abstract No. 1986–263907, abstract of Soviet Union Patent Specification No. 1213056 (Feb. 1986).*
Derwent Abstract No. 1988–196303, abstract of Soviet Union Patent Specification No. 1359286 (Dec. 1987).*

* cited by examiner

Primary Examiner—Anthony J. Green
(74) Attorney, Agent, or Firm—Millen, White, Zelano & Branigan, P.C.

(57) ABSTRACT

The invention relates to a non-dusting, homogeneous pigment preparation which is distinguished by the fact that it comprises at least 40% by weight of one or more effect pigments and 0.5–59.5% by weight of a modified colophony resin, based on the pigment preparation, and the use thereof, in particular for the production of dry preparations. The pigment preparation according to the invention and the dry preparations produced therefrom are particularly suitable for the pigmenting of paints, coatings, powder coatings, printing inks and plastics.

14 Claims, No Drawings

PIGMENT PREPARATION WITH MODIFIED COLOPHONY RESINS

The invention relates to a non-dusting, homogeneous pigment preparation which is distinguished by the fact that it comprises one or more effect pigments, e.g., at least 40% by weight, water and/or an organic solvent or solvent mixture, e.g., 0.5–50% by weight and a modified colophony resin, e.g., 0.5–59.5% by weight based on the pigment. Pigment preparations of this type are particularly suitable for the production of dry preparations, such as, for example, granules, chips, briquets, pellets, etc. The invention furthermore relates to the process for the production of the pigment preparation and. dry preparations, and to the use thereof for pigmenting water- and/or solvent-based paints, printing inks, coatings, etc., and plastics.

The use of effect pigments as dry powders in formulations and plastics is frequently afflicted with disadvantages, such as dust evolution and resultant problems at the workplace. A further disadvantage is that agglomeration of the pigment powder is frequently observed on incorporation of effect pigments into plastics, printing inks, industrial coatings, basecoat systems, etc. Homogeneous distribution of the pigment in the respective matrix is frequently difficult or even impossible to achieve.

In order to avoid these disadvantages, non-dusting pigment preparations or pigment-containing dry preparations, such as, for example, granules, are used instead of the pigment powder. The additional treatment of the pigments with a resin improves the applicational properties of the pigments. For treatment of the pigments, modified colophony resins are particularly suitable.

Good properties as printing-inks in offset or letterpress printing are exhibited by dust-free pigment preparations based on organic pigments, such as, for example, azo pigments, which are coated with a mixture of two different resins, for example based on colophony or colophony derivatives, each with a different acid number, as disclosed in EP 0 897 956 A2. A disadvantage here is the use of two coating resins in order to meet the technical requirements of the application.

In order to be able to produce water-thinnable printing inks with high gloss values and good transparency properties based on a non-dusting pigment preparation, EP 0 796 900 A2 describes pigment preparations based on an organic pigment suspended in an aqueous medium and coating thereof with a (colophony) resin having an acid number of $\geq 200$ mg of KOH/g of resin and a nonionic surfactant. The restriction to virtually exclusively water-thinnable printing inks and the use of two chemically very different modifiers comprising strongly "acidic" (colophony) resins and surfactants must be regarded as disadvantages. The latter is also responsible for the compatibility problems of this pigment preparation with a multiplicity of binder systems. A further disadvantage is the tendency towards crystallization of the aqueous solution of these acidic colophony resins.

Besides good compatibility with the other constituents of the coating system, pigment preparations or the dry preparations produced therefrom must result in the coating systems having high stability, i.e. they must not tend towards phase separation, or, where this cannot be completely prevented owing to the low viscosity, it must be easy to return the coating systems to a homogeneous state, i.e. the deposited sediment must be easy to stir up again. This requirement is particularly important in the case of pigment preparations based on platelet-form pigments, since these tend to cake during phase separation owing to their structure and can only be stirred up again with difficulty. Effect pigments based on platelet-form substrates cause handling problems inasmuch as the pigments sediment easily as a consequence of their size and density and can then agglomerate to form a very solid sediment cake. This cake can generally only be stirred up again with difficulty. This applies in particular during the storage of paints, coatings and printing inks, and during processing thereof.

Numerous methods have thus been developed for solving the problem of incorporation and handling of platelet-form pigments in coating compositions. Stirring-up can be made easier by adding to the coating compositions additives which cause either intentional flocculation (house of cards effect), non-Newtonian and/or thixotropic behavior, steric repulsion and/or electrostatic repulsion of the pigments amongst one another. However, these additives may have an adverse effect on the quality of the coating. In particular, the brightness in the case of effect pigments and the evenness of the coating may be impaired. Furthermore, homogeneous, stable distribution of the redispersants in the pearlescent pigment powder can only be achieved with difficulty, or the redispersant loses effectiveness after incorporation into the system.

The effect pigment preparations having a pigment proportion of $\geq 30\%$ by weight that have been developed hitherto for use in coating systems frequently only meet the described requirements to an inadequate extent, in particular because they have an increased tendency towards agglomeration and shear thickening.

The present invention therefore provides oxidation-stable pigment preparations based on effect pigments which can simultaneously be used very well in solvent-containing and solvent-free coating systems, have high stability, can be redispersed easily and are simultaneously distinguished by high compatibility with the other components of the coating system. Furthermore, the pigment preparation according to the invention is suitable for the position of dry preparations, for example in the form of pellets, chips, briquets, granules, etc.

Surprisingly, it has been found that these multifarious requirements are achieved by the provision of the pigment preparation according to the invention.

The invention thus relates to a non-dusting, homogeneous pigment preparation which comprises one or more effect pigments, e.g., $\geq 40\%$ by wt.

a modified colophony resin,.e.g., 0.5–59.5% by wt., said resin having an acid number of 90–200 mg of KOH/g of resin, a hydroxyl group content of 40–180 mg of KOH/g of resin and a softening range of 50–120° C., and water or of a solvent or solvent mixture, e.g., 0.5–50% by wt.

based on the pigment preparation.

Depending on the moisture content, the preparation according to the invention is a flowable paste or a moistened, flowable powder. Both are highly suitable for the production of dry preparations, for example granules, chips, pellets or briquets. The dry preparations produced from the pigment preparation according to the invention are likewise a subject-matter of the invention.

The products according to the invention are non-dusting and readily flowable, can be incorporated rapidly into commercially available binder systems and are compatible therein. In particular, the products are compatible with both aqueous, solvent-containing and solvent-free printing ink and coating systems. The inks and coatings produced via the dry preparation, for example granules, are suitable for gravure printing, flexographic printing, screen printing, offset overprint varnish (OPV) and for the various paint systems in the industrial coatings and automobile paints sector. They are also suitable for coloring plastics.

The pigment preparation according to the invention preferably comprises 40–98% by weight of effect pigments, in particular 45–95% by weight. Very particular preference is given to pigment preparations having an effect pigment content of greater than 50% by weight. The % by weight data are always based on the moist, i.e. undried pigment preparation.

The effect pigments used can be pigments based on platelet-form, transparent or semitransparent substrates comprising, for example, phyllosilicates, such as, for example, mica, synthetic mica, $SiO_2$ platelets, glass platelets, $TiO_2$ platelets, $Al_2O_3$ platelets, talc, sericite, kaolin, glass or other silicate materials, which are coated with rare-earth metal sulfides, such as, for example, $Ce_2S_3$, with colored or colorless metal oxides, such as, for example, $TiO_2$, titanium suboxides, titanium oxynitrides, pseudobrookite, $Fe_2O_3$, $Fe_3O_4$, $SnO_2$, $Cr_2O_3$, ZnO, CuO, NiO and other metal oxides, alone or as a mixture, in a single layer or in successive layers (multilayer pigments). Pearlescent pigments are disclosed, for example, in the German patents and patent applications 14 67 468, 19 59 998, 20 09 566, 22 14 454, 22 15 191, 22 44 298, 23 13 331, 25 22 572, 31 37 808, 31 37 809, 31 51 343, 31 51 354, 31 51 355, 32 11 602, 32 35 017 and P 38 42 330 and are commercially available, for example under the trade name Iriodin® from Merck KGaA, Darmstadt, Germany.

Particularly preferred pigment preparations comprise mica or $SiO_2$ platelets coated with $TiO_2$, $Fe_2O_3$ or $TiO_2/Fe_2O_3$. The $SiO_2$ platelets can be coated, for example, as described in WO 93/08237 (wet-chemical coating) or DE-A 196 14 637 (CVD process). $Al_2O_3$ platelets are disclosed, for example, in EP 0 763 573 A1. Platelet-form substrates coated with one or more rare-earth metal sulfides are disclosed, for example, in DE-A 198 10 317.

Also suitable are metal-effect pigments, in particular aluminium platelets which have been modified for aqueous and solvent-containing systems, as marketed by Eckart under the trade name Rotovario Aqua® or Stapa Hydroxal® for aqueous applications, and Variocrom® and Paliocrom® pigments from BASF, in particular also those from EP 0 681 009 A1, EP 0 632 110 A1, EP 0 634 458 A1, and LCP (liquid crystal polymer) pigments. Also suitable are all holographic pigments and metal-coated platelet-form pigments known to the person skilled in the art. Pigments of this type are marketed by the Flex, BASF, Eckart and Schlenk companies.

The pigment preparations according to the invention may comprise one or more effect pigments. Special color and gloss effects can frequently be achieved by the use of at least two different effect pigments. Preferred pigment preparations comprise one or more effect pigments based on mica and/or $SiO_2$ platelets. Also possible are blends with up to 10% by weight, based on the pigment preparation, of organic and inorganic pigments.

In particular, the addition of one or more dyes and/or organic pigments in ground form results in special color effects. Furthermore, substances and particles (tracers) which enable product identification may be added.

As a further component, the pigment preparation according to the invention comprises a modified colophony resin in amounts of 0.5–59.5% by weight, preferably 5–40% by weight, in particular 10–30% by weight, based on the pigment preparation.

Owing to its undesired properties, such as, for example, its poor oxidation and yellowing resistance and its high crystallization tendency, colophony is only employed in chemically modified form. The carboxyl groups present in the resin acids and the conjugated system of double bonds are utilized here. The properties of colophony resins can be controlled by the adduction of $\alpha,\beta$-unsaturated carbonyl compounds. The resultant adduct is characterized by a higher softening point and a higher acid number. For applications such as, for example, printing inks and coatings, the colophony is multiply modified, for example with maleic anhydride, formaldehyde and then by esterification of the resultant intermediate with polyhydric alcohols. Other processes are based on disproportionation, hydrogenation and dimerization. The disproportionated and hydrogenated colophony is characterized by very high oxidation stability, which prevents its subsequent darkening. One of ordinary skill can easily, with only routine experimentation, adjust the properties of the colophony (e.g., acid number, softening range, and hydroxyl group content) to reach desired levels, and/or select commercially available colophony meeting desired levels.

The pigment preparation according to the invention preferably comprises colophony resins carrying carboxyl groups, such as maleic and/or fumaric, more preferably maleic and fumaric acid-modified colophony resins. Particular preference is given to colophony resins which have been fully or partially esterified.

Modified colophony resins are generally commercially available and are marketed, for example, by Kraemer under the trade names Erkamar®, Bremazit®, Bremapal®, Bremasin® and Bremar®.

The modification of colophony and the production of resins based thereon is known in general terms and is described, inter alia, in the following references:

H. Kittel, "Lehrbuch der Lacke und Beschichtungen" [Text Book of Paints and Coatings], Hinzel Verlag 1998, Volume 1, Sections 1.4.1.1.6 and 1.4.2.1.1

Ullmann's Encyclopedia of Industrial Chemistry, VCH 1993, Vol. A 23, pp. 84–85

Gang-Fung Chen, "Developments in the field of rosin chemistry and its implications in coatings", Progress in Organic Coatings, 20 (1992), pp. 139–167

The raw materials used for the production of modified colophony resins typically include the following:

a) natural resin acids, such as gum rosin, tall rosin and wood rosin, which may optionally have been fully or partially disproportionated, hydrogenated or dimerized;

b) $\alpha\beta$-ethylenically unsaturated carboxylic acids or anhydrides thereof, in particular fumaric acid, maleic acid, maleic anhydride, itaconic acid, acrylic acid and methacrylic acid;

c) hydroxyl-containing esterifying agents, preferably polyfunctional alcohols, for example glycols, glycerol, trimethylolpropane and pentaerythritol;

d) ethylenically unsaturated hydrocarbon resins, preferably polymers or oligomers of mono- and/or polyethylenically unsaturated ($C_5$–$C_9$)-hydrocarbons consisting, in particular, of coumarone, indene, cyclopentadiene, dicyclopentadiene or isoprene units;

e) condensation catalysts, preferably tin, calcium, zinc or magnesium compounds, such as salts, oxides or hydroxides;

f) fatty acids, preferably vegetable, animal and synthetic fatty acids, such as, for example, caproic acid, caprylic acid, capric acid, lauric acid, myristic acid, palmitic acid, stearic acid, oleic acid and linoleic acid, and fatty acid mixtures.

The modified colophony resins are usually produced in a plurality of steps. In the first step, the raw materials from group a) and/or d) are reacted with the components from group b) at temperatures of from 160 to 230° C. In a second reaction step, the reaction with the raw materials from group c) is then carried out, if desired with addition of catalysts from group e) and raw materials from group f). The usual condensation temperatures are in the range 160–260° C.

However, this technology and temperature program are not absolutely necessary and can be varied in certain parts, depending on the choice of raw materials and the target parameter ranges, as would be well understood by one of ordinary skill in the art.

Independently of the production process and the choice of raw materials, these properties of the modified colophony resins in the pigment preparation according to the invention that the following parameters are achieved simultaneously:

acid number 90–200 mg of KOH/g of resin, preferably 120–180 mg of KOH/g of resin, softening range 50–120° C., preferably 60–100° C., particularly preferably 70–90° C., hydroxyl group content 40–180 mg of KOH/g of resin, preferably 80–140 mg of KOH/g of resin.

The softening temperature is usually measured using a Kofler hot bench (6 minute value).

Particular preference is given to modified colophony resins which simultaneously have the following parameters:

acid number 90–200 mg of KOH/g of resin, preferably 120–180 mg of KOH/g of resin, softening range 50–120° C., preferably 60–100° C., particularly preferably 70–90° C., hydroxyl group content 40–180 mg of KOH/g of resin, preferably 80–140 mg of KOH/g of resin, and iodine number $\leq$100 g of iodine/100 g of resin, preferably $\leq$70 g of iodine/100 g of resin.

The viscosity of the modified colophony resins is generally 20–80 s, preferably 25–45 s. The viscosity is generally measured as a 65% solution in ethanol at 20° C. in a 4 mm DIN cup.

The modified colophony resins are distinguished by properties which make them capable of the production of the pigment preparation according to the invention:

water solubility after neutralization oxidation stability and UV resistance solubility in monomers and oligomers, alcohols, esters, aromatics and other organic solvents known to the person skilled in the art no tendency towards crystallization, for example in aqueous and ethanolic solution very good wettability of effect pigments broad compatibility both with polar and with nonpolar commercially available binder systems attainment of high mechanical strength of the pigment preparations: produced therewith, in particular of the dry preparations.

The pigment preparation according to the invention furthermore comprises water and/or of an organic solvent or solvent mixture, e.g., from 0.5 to 50% by weight preferably from 1 to 45% by weight, in particular from 1 to 40% by weight, based on the pigment preparation.

The solvent component in the pigment preparation according to the invention is preferably matched to the properties of the colophony resin, as well understood in the art. Water and all organic solvents can be employed in the production. Examples of suitable solvents are aromatic solvents, for example toluenes, benzines, xylenes, mineral oils, hydrocarbons, esters, long-chain amines, vegetable oils, monohydric aliphatic alcohols, such as those having 2 to 4 carbon atoms, for example ethanol, butanol or isopropanol, or ketones, for example acetone or methyl ethyl ketone, or glycol ethers, such as, for example, propylene glycol monomethyl ether, propylene glycol monoethyl ether, or diols, such as, for example, ethylene glycol and propylene glycol, or polyetherdiols, aliphatic triols and tetrols having 2 to 6 carbon atoms, such as trimethylolethane, trimethylolpropane, glycerol, 1,2,4-butahetriol, 1,2,6-hexanetriol and pentaerythritol, and all other solvents from other classes of compound, or mixtures of the above-mentioned solvents. Preference is given to the solvents listed in Karsten, Lackrohstofftabellen [Tables of Raw Materials for Coatings], $9^{th}$ Edition, 1992.

The water-based pigment preparations according to the invention or dry preparations produced therefrom may comprise one or more neutralizers as a further component. Particularly suitable are the bases which are usual in the coatings sector, such as, for example, urea, urea derivatives, ammonia, aminoalcohols, alkali metal hydroxides, such as, for example, KOH or NaOH, and amines; in the case of preparations for aqueous applications, preference is given to nonvolatile organic low-molecular-weight amines or those which have low volatility at 100° C.

The water-based pigment preparation according to the invention preferably comprises from 0.05 to 10% by weight of a neutralizer, preferably from 1 to 7% by weight, in particular from 1.5 to 3% by weight, based on the pigment preparations.

The pigment preparation according to the invention may preferably comprise a modifier as a further component in amounts of from 0.05 to 10% by weight, preferably from 0.05 to 5% by weight, in particular from 0.05 to 3% by weight. In particular, the modifier employed is a polyalkylene oxide or polyalkylene oxide derivative in order to improve the strength of the dry granules and the compatibility. Other suitable modifiers are spherical particles, acrylate resins, maleate resins, urethane resins, nitrocellulose and all known cellulose derivatives, polyesters, PVC, polyalkylene glycol, polyalkylene glycol esters and ethers, emulsifiers, surfactants, polyacrylate or polymethacrylate or fibrous particles having a fiber length of 0.1–20 $\mu$m, in amounts of from 0.05 to 10% by weight, preferably from 0.05 to 5% by weight, in particular from 0.05 to 3% by weight, based on the pigment preparation. The use of such modifiers is conventional in the art.

If necessary, a redispersant in the form of bulky particles, such as, for example, fibers or spherical particles, is added in order to prevent the effect pigments treated by the process according to the invention from lying one on top of the other to a significant extent owing to steric repulsion and thus exerting strong adhesion. This has the effect that 1. the preparations according to the invention are more stable, and
2. after incorporation of the pigment preparation or the dry preparations produced therefrom into the coating, printing ink or paint system, the effect pigments in some cases settle much more slowly, but the sediment is in all cases less hard, and that no problems occur in stirring up the sediment again.

The redispersant is preferably employed in amounts of from 0 to 5% by weight, in particular from 0.05 to 3% by weight, based on the pigment preparation. All organic and inorganic fibers having a fiber length of 0.1–20 µm that are known to the person skilled in the art can be used. Suitable particles are, in particular, all synthetic fibers, for example made from polyethylene, polyacrylates, polypropylene, polyamides, cellulose fibers, inorganic fibers, here preferably silicon compounds, glass fibers and in particular the products of the condensation of modified isocyanates and mono- and diamines. These condensation products, which are diurea derivatives and aminoureas containing urethane groups, are known as thixotropic agents and are added with a binder to paints and coatings in order to improve the flow properties and the spreadability.

The redispersants used may furthermore be all diurea and urethane compounds known to the person skilled in the art, as described, for example, in EP 0 198 519 and in Organic Coatings: Science and Technology, A. Heenriga, P. J. G. von Hemsbergen, pp. 201–222, New York 1983.

Suitable spherical materials are, in particular, hollow glass, wax or polymer beads made from vinyl resins, nylon, silicone, epoxy resins, olefin resins, polystyrenes and inorganic materials, such as, for example, $TiO_2$, $SiO_2$ or $ZrO_2$. Preference is given to hollow beads, furthermore also solid beads, having a particle size of from 0.05 to 150 µm. Particular preference is given to the use of hollow glass, wax or polymer beads in the pigment preparation according to the invention.

Spherical particles based on $SiO_2$ in a particle size range of 3–10 µm are known, for example, as materials for high-pressure liquid chromatography and are marketed, for example, as LiChrospher® by Merck KGaA, Darmstadt, Germany. Such materials are preferably employed in monodisperse form, i.e. with the most uniform particle size possible. Monodisperse spherical particles of this type based on $SiO_2$, $TiO_2$ and $ZrO_2$ are known. Monodisperse $SiO_2$ can be produced, for example, in accordance with EP 0 216 278 B1. Hollow glass beads are marketed, for example, under the trade name Q-CEL by PQ Corporation, USA, or Scotchlite by 3M, Frankfurt, Germany.

In addition, the pigment preparation according to the invention may comprise surface-active substances, such as, for example, alkylsilanes, which may also contain a further functional group, unsaturated or saturated fatty acids or fluorinated surfactants. Particular preference is given to the use of silane compounds of the formula $(C_nH_{2n+1})Si-(OC_mH_{2m+1})_3$, in which n is 1–30 and m is 1–10, as surface-active substances, Suitable silane compounds are, for example, n-hexyldecyltriethoxysilane and n-octyldecyltriethoxysilane (Si 116 or Si 118 from Degussa AG, Frankfurt), and the corresponding fluoroalkylsilanes.

Other surface-active substances which can be employed are saturated and unsaturated fatty acids, such as, for example, caproic acid, caprylic acid, capric acid, lauric acid, myristic acid, palmitic acid, stearic acid, oleic acid, linoleic acid and fatty acid mixtures.

Besides the silane, the pigment preparation preferably additionally comprises a surfactant or a fatty acid. The surface-active reagent may also be a mixture of silane, fatty acids and/or surfactants. The pigment preparations may comprise from 0.1 to 5% by weight, preferably from 0.2 to 3% by weight and in particular from 0.5 to 2% by weight of surface-active substances, based on the pigment.

The pigment preparation according to the invention is usually produced by adding the modified colophony resin, in aqueous or organic solution, optionally a modifier and further additives simultaneously or successively to the effect pigment or effect pigment mixture, and homogenizing this mixture under gentle conditions.

The pigment is preferably initially introduced and firstly formed into a paste with stirring with the solvent comprising the colophony resin (granulation solution) and, if desired, already the modifier; this is followed, if desired, by the addition of a further solution consisting of solvent and additives.

Further conventional additives, such as, for example, antifoams, wetting agents, antisettling agents, flow-control agents, siccatives or thixotropic agents, can be added to the pigment preparation according to the invention during or after the production. These are auxiliaries which are usual in the coatings industry and which may be present in the pigment preparation according to the invention in an amount of from 0 to 10% by weight. Particular mention is made here of succinate derivatives, for example those as marketed by Henkel under the trade name Hydropalat 875.

The resultant moist pigment preparation according to the invention is a homogeneous powder or free-flowing paste or moist granules having a relatively high content of effect pigments. Granules, for example in spherical form, have very good flow properties and are easy to meter and as well as all these properties are completely free from dust. The volume of these granules is reduced to about ⅓ of the volume of pearlescent pigment powders.

In order to produce dry preparations, the pigment preparation according to the invention is extruded or compressed into a compact particle form by other methods known to the person skilled in the art, for example by tabletting, briquetting, pelleting, granulation, spray granulations, fluidisedbed granulation or extrusion, and if necessary then dried. The drying process is generally carried out at temperatures of from 20 to 150° C., preferably at from 60 to 120° C., and may, if desired, be carried out under reduced pressure. The dry preparations, such as, for example, granules, have pigment contents of >70% by weight, preferably >80% by weight. Finally, the dry preparation is, if desired, classified by size.

The particle sizes of the granules, pellets, chips, briquets, etc., are in the range from 0.1 to 150 mm, preferably from 0.1 to 20 mm, in particular from 0.1 to 2 mm.

The dry preparations obtained in this way have positive properties which are further increased compared with the water- or solvent-containing preparations according to the invention:

The dry products are non-dusting, free-flowing and can be incorporated rapidly into commercially available binder systems and are compatible therewith. In particular, the products are compatible both with aqueous, solvent-containing and solvent-free printing inks and coating systems.

The missing liquid components increase the compatibility and exhibit no disadvantages in wetting.

After addition of the dry preparations to an aqueous binder or a polar solvent-containing binder (ethanol, ethyl acetate, MEK, etc.), the granules break down quickly and the pigments are fully wetted immediately.

Further advantages of the dry preparations are the improved shelf life, easier transport and improved production safety for the customer.

Integration of a redispersion aid ensures that the pigment preparations according to the invention can also be stirred up easily in the finished paint and coating systems and require no further significant improvement by the final formulator.

The improved deagglomeration of the dry preparations incorporated into a binder, for example into a printing ink, is evident even with small amounts of spherical particles in the pigment preparation. Thus, even on use of granules having a content of 0.5% by weight of spherical particles, based on the dry preparation, the dissolution rate is significantly increased and the stability of the printing ink achieved more quickly (viscosity/hue).

The preparation according to the invention in the form of a moistened powder or paste or in the form of a dry preparation can be used for multifarious applications. It is preferably employed in coating systems from the areas of printing, in particular overprint varnishing, offset overprint varnishing and gravure printing, flexographic printing and screen printing. The preparation or the dry preparation produced therefrom, as precursor for coating compositions, is particularly preferably applied to any desired substrate materials, for example metals, such as iron, steel, aluminium, copper, bronze, plastic, brass and metal foils, but also glass, ceramic and concrete, and also to wood, for example furniture, clay, textile, paper, packaging materials, for example plastic containers, films or cardboard, or to other materials for decorative and/or protective purposes.

The invention thus also relates to the use of the pigment preparation and the dry preparations produced therefrom in formulations such as paints, powder coatings, coatings, such as, for example, industrial and automobile paints, printing inks, as well as plastics and coating compositions of all types.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents and publications, cited above, and of corresponding German patent application No. DE 100 23 286.8, filed May 12, 2000 are hereby incorporated by reference.

EXAMPLES

Example 1

1.1 Production of the Granulation Solution 163.5 g of demineralized water at 50° C. are initially introduced, and 54 g of modified colophony resin [acid number 168 mg of KOH/g of resin, softening point 72° C., hydroxyl group content: 122 mg of KOH/g of resin, iodine number: 67 g of iodine/100 g of resin, viscosity 30 s (65% solution in ethanol, DIN 4 cup, 20° C.)] are introduced by means of a 4-blade stirrer 12 g of 25% ammonia solution are then slowly added, and the mixture is stirred until the modified colophony resin has completely dissolved. Then firstly 163.5 g of water and then 12 g of polyethylene glycol 2000 (Merck KGaA) are added with stirring, and finally the mixture is stirred for 5 minutes.

1.2 Production of the Granules

In order to produce the granules, good mixing must be ensured. The mixture is produced on a 1 kg scale with the aid of an Eirich R02 mixer.

595 g of Iriodin® 123 (TiO$_2$ mica pigment with a particle size of 5–20 µm from Merck KGaA, Germany) are introduced into the mixer tank, and 405 g of granulation solution from Example 1.1 are slowly added. The mixture is mixed homogeneously. The moistened mixture is granulated in an Eirich TR 01 disc granulator. The moist, granulated mixture is dried at 80° C. and 100 mbar. The dried granules are firstly passed through a sieve with a mesh width of 2 mm (coarse fraction) and subsequently the fines are separated off by classification through a 400 µm sieve.

The product is abrasion-resistant and dimensionally stable and is compatible with, for example, the customary solvent-free, free-radical UV-curing Rayoflex varnish 11 HF 60 (UV varnish) from Hartmann Druckfarben, and the solvent-containing varnish Haptobond CT 105 (basis: nitrocellulose, solvent: ethanol) from Hartmann Druckfarben. In addition, it exhibits compatibility with the aqueous offset overprint varnish 350081 from Weilburger Lackfabrik.

Example 2

2.1 Production of the Granulation Solution 163.5 g of demineralized water at 50° C. are initially introduced, and 54 g of modified colophony resin in accordance with Example 1.1 are introduced by means of a 4-blade stirrer at 300 rpm over the course of 1 minute. 12 g of 25% ammonia solution are then slowly added, and the mixture is stirred until the modified colophony resin has completely dissolved. Then firstly 163.5 g of water and then 12 g of Hydropalat 875 (Na salt of sulfosuccinic acid from Henkel) are added with stirring, and the mixture is stirred for 5 minutes at 300 rpm.

2.2 Production of the Granules

In order to produce the granules, good mixing must be ensured. The mixture is produced on a 1 kg scale with the aid of an Eirich R02 mixer.

To this end, 595 g of Iriodin® 123 are introduced into the mixer tank, and 405 g of granulation solution are slowly added. The mixture is mixed homogeneously. The moistened mixture is granulated in an Eirich TR 01 disc granulator. The moist, granulated mixture is dried at 80° C. and 100 mbar. The dried granules are firstly passed through a sieve with a mesh width of 2 mm (coarse fraction) and subsequently the fines are separated off by classification through a 400 µm sieve.

The product is abrasion-resistant and dimensionally stable and is compatible with the customary solvent-free, free-radical UV-curing Rayoflex varnish 11 HF 60 from Hartmann Druckfarben, and the solvent-containing NC varnish Haptobond CT 105 from Hartmann Druckfarben. In addition, it exhibits compatibility with the aqueous offset overprint varnish 350081 from Weilburger Lackfabrik.

Example 3

3.1 Production of the Granulation Solution 163.5 g of demineralized water at 50° C. are initially introduced, and 54 g of modified colophony resin in accordance with Example 1.1 are introduced by means of a 4-blade stirrer at 300 rpm over the course of 1 minute.

12 g of 25% ammonia solution are then slowly added, and the mixture is stirred until the modified colophony resin has completely dissolved. Then firstly 163.5 g of water and then 12 g of polyethylene glycol 2000 are added with stirring, and finally the mixture is stirred for 5 minutes at 300 rpm.

3.2 Production of the Granules

In order to produce the granules, good mixing must be ensured. The mixture is produced on a 1 kg scale with the aid of an Eirich R02 mixer.

To this end, 595 g of Iriodin® 123 are introduced, and 405 g of granulation solution are slowly added. At a speed of 300–500 rpm, 19.5 g of Solcolor Green (Cl PG 7) pigment preparation from MK Chemicals are also added. The mixture is mixed homogeneously. The moistened mixture is granulated in an Eirich TR 01 disc granulator. The moist, granulated mixture is dried at 80° C. and 100 mbar. Greenish pearlescent granules with interesting coloristic properties are obtained.

The dried granules are firstly passed through a sieve with a mesh width of 2 mm (coarse fraction) and subsequently the fines are separated off by classification through a 400 µm sieve.

The product is abrasion-resistant and dimensionally stable and is compatible with the customary solvent-free, free-radical UV-curing Rayoflex varnish 11 HF 60 from Hartmann Druckfarben, and the solvent-containing NC varnish Haptobond CT 105 from Hartmann Druckfarben. In addition, it exhibits compatibility with the aqueous offset overprint varnish 350081 from Weilburger Lackfabrik.

Example 4

4.1 Production of the Granulation Solution 163.5 g of demineralized water at 50° C. are initially introduced, and 54 g of modified colophony resin in accordance with Example 1.1 are introduced by means of a 4-blade stirrer at 300 rpm. 12 g of 25% ammonia solution are then slowly added, and the mixture is stirred until the modified colophony resin has completely dissolved. Then firstly 163.5 g of water and then 12 g of Hydropalat 875 (Na salt of sulfosuccinic acid from Henkel) are added with stirring, and the mixture is stirred for 5 minutes at 300 rpm.

4.2 Production of the Granules

In order to produce the granules, good mixing must be ensured. The mixture is produced on a 1 kg scale with the aid of an Eirich R02 mixer.

To this end, 595 g of Iriodin® 123 are introduced into the mixer tank, and 405 g of granulation solution are slowly added. At a speed of 300–500 rpm, 19.5 g of Solcolor Yellow (Cl PY 83) pigment preparation from MK Chemicals are also added. The mixture is mixed homogeneously. The moistened mixture is granulated in an Eirich TR 01 disc granulator. The moist, granulated mixture is dried at 80° C. and 100 mbar. Yellowish pearlescent granules with interesting coloristic properties are obtained. The dried granules are firstly passed through a sieve with a mesh width of 2 mm (coarse fraction) and subsequently the fines are separated off by classification through a 400 µm sieve.

The product is abrasion-resistant and dimensionally stable and is compatible with the customary solvent-free, free-radical UV-curing Rayoflex varnish 11 HF 60 from Hartmann Druckfarben, and the solvent-containing NC varnish Haptobond CT 105 from Hartmann Druckfarben. In addition, it exhibits compatibility with the aqueous offset overprint varnish 350081 from Weilburger Lackfabrik.

Example 5

5.1 Production of the Granulation Solution 164.5 g of ethanol are initially introduced, and 54 g of modified colophony resin in accordance with Example 1.1 are introduced by means of a 4-blade stirrer at 300 rpm, and the mixture is stirred until the colophony resin has completely dissolved. Then firstly 164.5 g of ethanol and then 12 g of polyethylene glycol 2000 are added with stirring, and the mixture is stirred for 5 minutes at 300 rpm.

5.2 Production of the Granules

In order to produce the granules, good mixing must be ensured. The mixture is produced on a 1 kg scale with the aid of an Eirich R02 mixer.

To this end, 595 g of Iriodin® 123 are introduced into the mixer tank, and 405 g of granulation solution are slowly added. The mixture is mixed homogeneously. The moistened mixture is granulated in an Eirich TR 01 disc granulator. The moist, granulated mixture is dried at 80° C. and 100 mbar. The dried granules are firstly passed through a sieve with a mesh width of 2 mm (coarse fraction) and subsequently the fines are separated off by classification through a 400 µm sieve.

The product is abrasion-resistant and dimensionally stable and is compatible with the customary solvent-free, free-radical UV-curing Rayoflex varnish 11 HF 60 from Hartmann Druckfarben.

However, incompatibilities arise with the following commercially available extender systems based on polar solvents:

| Trade name | System basis/solvent | Manufacturer |
| --- | --- | --- |
| Haptobond F 105 | Nitrocellulose/ethanol | Hartmann Druckfarben |
| Haptobond CT 105 | Nitrocellulose/ethanol | Hartmann Druckfarben |
| Senolith 350081 | Styrene/acrylate dispersion | Weilburger Lackfabrik |

Example 6 (Comparison 1)

6.1 Production of the Granulation Solution 164.5 g of demineralized water at 50° C. are initially introduced, and 54 g of modified colophony resin having an acid number of 175 mg of KOH/g of resin, a softening point of 144° C. (6 minute value on Kofler hot bench), a hydroxyl group content of 160 mg of KOH/g of resin, an iodine number of 88 g/100 g of resin and a viscosity of 122 s (60% solution in ethanol, DIN 4 cup, 20° C., since 65% solution in ethanol cannot be measured in a DIN 4 cup) are introduced by means of a 4-blade stirrer at 300 rpm.

12 g of 25% ammonia solution are then slowly added, and the mixture is stirred until the modified colophony resin has completely dissolved. Then firstly 162.2 g of cold water and then 12 g of polyethylene glycol 2000 are added with stirring, and the mixture is stirred for 5 minutes at 300 rpm.

6.2 Production of the Granules

In order to produce the granules, good mixing must be ensured. The mixture is produced on a 1 kg scale with the aid of an Eirich R02 mixer.

To this end, 595 g of Iriodin® 123 are introduced into the mixer tank, and 405 g of granulation solution are slowly added. The mixture is mixed homogeneously. The moistened mixture is granulated in an Eirich TR 01 disc granulator. The moist, granulated mixture is dried at 80° C. and 100 mbar. The dried granules are firstly passed through a sieve with a mesh width of 2 mm (coarse fraction) and subsequently the fines are separated off by classification through a 400 µm sieve.

The product is abrasion-resistant and dimensionally stable, but exhibits incompatibilities with the following commercially available extender systems which are based on polar solvents or are solvent-free:

| Trade name | System basis/solvent | Manufacturer |
|---|---|---|
| Haptobond F 105 | Nitrocellulose/ethanol | Hartmann Druckfarben |
| Haptobond CT 105 | Nitrocellulose/ethanol | Hartmann Druckfarben |
| Senolith 350081 | Styrene/acrylate dispersion | Weilburger Lackfabrik |
| Rayoflex 11 HF 60 | Free-radical-curing UV system/acrylate oligomers/monomers | Hartmann Druckfarben |
| 95 PA 010-B | Polyvinylbutyral/ethanol | Gebrüder Schmidt |
| 90 EH 010-EVP | Polyvinyl chloride/ethyl methyl ketone | Gebrüder Schmidt |

What is claimed is:

1. A non-dusting, homogeneous pigment preparation comprising
   at least one effect pigment,
   a modified colophony resin having an acid number of 90–200 mg of KOH/g of resin, a hydroxyl group content of 40–180 mg of KOH/g of resin and a softening range of 50–120° C., and
   water, a solvent or solvent mixture.

2. The preparation according to claim 1, comprising ≧40% by weight effect pigment, 0.5–59.5% by weight modified colophony resin, and 0.5–50% by weight water, solvent or solvent mixture, based on the pigment preparation.

3. The preparation according to claim 1, wherein the colophony resin has been modified by reacting with at least one of maleic acid or fumaric acid.

4. The non-dusting preparation according to claim 1, wherein the colophony resin has been fully or partially esterified.

5. The non-dusting preparation according to claim 1, additionally comprising 0.05–10% by weight of a neutralizer.

6. The preparation according to claim 1, additionally comprising 00.05–10% by weight of a modifier increasing the strength or compatibility of the preparation.

7. The preparation according to claim 1, wherein the effect pigment is a pearlescent pigment, an $SiO_2$ platelet coated with one or more metal oxides, or a mixture thereof.

8. The preparation according to claim 7, wherein the pearlescent pigment is a $TiO_2$/mica or $Fe_2O3$/mica pigment.

9. The preparation according to claim 7, wherein the effect pigment is an $SiO_2$ platelet coated with $TiO_2$ and/or $Fe_2O_3$.

10. The pigment preparation according to claim 1, further comprising antifoams, surface-active substances, wetting agents, antisettling agents, flow-control agents, siccatives and/or thixotropic agents.

11. In a paint, coating, powder coating, printing ink, or plastic comprising an effect pigment, the improvement wherein the effect pigment is a preparation according to claim 1.

12. A dry, non-dusting, homogenous pigment preparation, comprising
   at least one effect pigment, and
   a modified colophony resin having an acid number of 90–200 mg of KOH/g of resin, a hydroxyl group content of 40–180 mg of KOH/g of resin and a softening range of 50–120°C.

13. The preparation according to claim 12, in the form of granules, briquettes, chips or pellets.

14. A dry preparation according to claim 12, produced from a non-dusting, homogeneous pigment preparation containing water, a solvent or solvent mixture, by tabletting, briquetting, pelleting, fluidised-bed granulation, granulation, spray granulation or extrusion, and optionally, eliminating solvent.

* * * * *